United States Patent
Sheffield et al.

(10) Patent No.: US 12,101,310 B2
(45) Date of Patent: *Sep. 24, 2024

(54) SYSTEMS AND TECHNIQUES FOR TRANS-ACCOUNT DEVICE KEY TRANSFER IN BENEFIT DENIAL SYSTEM

(71) Applicant: Lowe's Companies, Inc., Mooresville, NC (US)

(72) Inventors: Mason E. Sheffield, Woodinville, WA (US); Jonothon Frederick Douglas, Kirkland, WA (US); Paul Michael Sisneros, Kirkland, WA (US); Joseph Ygona Laurino, Sammamish, WA (US)

(73) Assignee: Lowe's Companies, Inc., Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,664

(22) Filed: Oct. 17, 2023

(65) Prior Publication Data

US 2024/0048548 A1  Feb. 8, 2024

Related U.S. Application Data

(60) Continuation of application No. 17/846,447, filed on Jun. 22, 2022, now Pat. No. 11,831,636, which is a (Continued)

(51) Int. Cl.
*H04L 9/40* (2022.01)
*H04L 9/06* (2006.01)
*H04L 9/32* (2006.01)

(52) U.S. Cl.
CPC ........ *H04L 63/0823* (2013.01); *H04L 9/0637* (2013.01); *H04L 9/3247* (2013.01);
(Continued)

(58) Field of Classification Search
CPC ............. H04L 63/0823; H04L 63/0876; H04L 63/0853; H04L 9/3247; H04L 9/0637; G06F 2221/2141
See application file for complete search history.

(56) References Cited

U.S. PATENT DOCUMENTS

| | | | |
|---|---|---|---|
| 4,907,117 A | 3/1990 | Pease et al. | |
| 5,594,228 A | 1/1997 | Swartz et al. | |
| (Continued) | | | |

FOREIGN PATENT DOCUMENTS

| | | | |
|---|---|---|---|
| CN | 1809833 A | 7/2006 | |
| CN | 105900398 A | 8/2016 | |
| (Continued) | | | |

OTHER PUBLICATIONS

"Bosch Toolbox App", Robert Bosch GmbH, Available Online at: bosch-professional.com, Feb. 18, 2018, 6 pages.
(Continued)

*Primary Examiner* — Huan V Doan
(74) *Attorney, Agent, or Firm* — Kilpatrick Townsend & Stockton LLP

(57) ABSTRACT

Techniques described herein are directed toward enabling a transfer of access rights for an electronic device between users. In embodiments a transferee device may receive a first request to obtain access rights for an electronic device associated with a transferor device. The transferor device may receive a second request to grant access rights for the electronic device. Embodiments may include receiving, at the transferee device, a device key associated with the electronic device and storing the device key in association with the electronic device. Embodiments may further include issuing a command from at least one of the transferee or transferor devices to unlock the electronic device, and causing the electronic device to comply with the command to unlock if the at least one of the transferee or
(Continued)

transferor devices that issues the command has access to the device key when the command is issued.

20 Claims, 7 Drawing Sheets

Related U.S. Application Data continuation of application No. 16/894,591, filed on Jun. 5, 2020, now Pat. No. 11,381,553, which is a division of application No. 16/779,431, filed on Jan. 31, 2020, now Pat. No. 10,721,224.

(52) U.S. Cl.
CPC ...... *H04L 63/0853* (2013.01); *H04L 63/0876* (2013.01); *G06F 2221/2141* (2013.01)

(56) References Cited

U.S. PATENT DOCUMENTS

| | | | |
|---|---|---|---|
| 5,748,084 A | 5/1998 | Isikoff | |
| 5,874,902 A | 2/1999 | Heinrich et al. | |
| 6,130,602 A | 10/2000 | O'Toole et al. | |
| 6,255,958 B1 | 7/2001 | Haimovich et al. | |
| 6,317,028 B1 | 11/2001 | Valiulis | |
| 6,598,790 B1 | 7/2003 | Horst | |
| 6,607,125 B1 | 8/2003 | Clouser et al. | |
| 7,275,686 B2 | 10/2007 | Estakhri et al. | |
| 7,391,326 B2 | 6/2008 | Puzio et al. | |
| 7,530,489 B2 | 5/2009 | Stockton | |
| 7,564,360 B2 | 7/2009 | Cote et al. | |
| 7,619,528 B2 | 11/2009 | Kobres | |
| 8,941,498 B2 | 1/2015 | Berg | |
| 9,117,355 B2 | 8/2015 | Mohiuddin et al. | |
| 9,189,663 B2 | 11/2015 | Goren et al. | |
| 9,193,330 B2 | 11/2015 | Abshire | |
| 9,228,378 B1 | 1/2016 | Sarabi et al. | |
| 9,298,954 B1 | 3/2016 | Ewing | |
| 9,460,597 B1 | 10/2016 | Clark et al. | |
| 9,700,997 B2 | 7/2017 | Schlegel et al. | |
| 9,779,603 B1 | 10/2017 | Subramanian et al. | |
| 9,852,596 B2 | 12/2017 | Alexis | |
| 9,888,337 B1 | 2/2018 | Zalewski et al. | |
| 10,097,353 B1 | 10/2018 | Carlson | |
| 10,186,128 B2 | 1/2019 | Gao et al. | |
| 10,332,117 B2 | 6/2019 | Krause et al. | |
| 10,354,507 B1 | 7/2019 | Lercari | |
| 10,438,470 B2 | 10/2019 | Wulff | |
| 10,701,561 B1 | 6/2020 | Sheffield et al. | |
| 10,721,224 B1 | 7/2020 | Sheffield et al. | |
| 11,161,231 B2 | 11/2021 | Obermann et al. | |
| 11,381,553 B2 | 7/2022 | Sheffield et al. | |
| 11,395,142 B2 | 7/2022 | Sheffield et al. | |
| 11,763,610 B2 | 9/2023 | Davis et al. | |
| 11,831,636 B2 | 11/2023 | Sheffield et al. | |
| 2002/0050928 A1 | 5/2002 | Olsen et al. | |
| 2002/0059148 A1 | 5/2002 | Rosenhaft et al. | |
| 2003/0042316 A1 | 3/2003 | Teraura | |
| 2004/0145477 A1 | 7/2004 | Easter et al. | |
| 2004/0230488 A1 | 11/2004 | Beenau et al. | |
| 2004/0238621 A1 | 12/2004 | Beenau et al. | |
| 2004/0263319 A1 | 12/2004 | Huomo | |
| 2005/0128083 A1 | 6/2005 | Puzio et al. | |
| 2005/0200485 A1 | 9/2005 | Connolly et al. | |
| 2005/0289359 A1 | 12/2005 | Mori et al. | |
| 2006/0071753 A1 | 4/2006 | Lamar | |
| 2007/0011729 A1 | 1/2007 | White | |
| 2007/0199988 A1 | 8/2007 | Labgold et al. | |
| 2007/0200664 A1 | 8/2007 | Proska et al. | |
| 2007/0296589 A1 | 12/2007 | Cullum | |
| 2008/0238609 A1 | 10/2008 | Wiesner et al. | |
| 2009/0043681 A1 | 2/2009 | Shoji et al. | |
| 2009/0201125 A1 | 8/2009 | Ikeguchi et al. | |
| 2010/0289627 A1 | 11/2010 | McAllister et al. | |
| 2011/0137797 A1 | 6/2011 | Stals et al. | |
| 2011/0254687 A1 | 10/2011 | Arponen et al. | |
| 2012/0111589 A1 | 5/2012 | Schmidt et al. | |
| 2012/0124388 A1 | 5/2012 | Chng et al. | |
| 2012/0150742 A1 | 6/2012 | Poon et al. | |
| 2012/0271712 A1 | 10/2012 | Katzin et al. | |
| 2012/0331292 A1 | 12/2012 | Haggerty et al. | |
| 2013/0066918 A1 | 3/2013 | Nejat et al. | |
| 2013/0227285 A1 | 8/2013 | Bracher et al. | |
| 2014/0019241 A1 | 1/2014 | Treiser et al. | |
| 2014/0158389 A1 | 6/2014 | Ito et al. | |
| 2014/0176305 A1 | 6/2014 | Aljadeff | |
| 2014/0207660 A1 | 7/2014 | Brink et al. | |
| 2014/0372743 A1 | 12/2014 | Rogers et al. | |
| 2014/0373184 A1 | 12/2014 | Mahaffey et al. | |
| 2015/0022358 A1 | 1/2015 | Huang | |
| 2016/0021116 A1 | 1/2016 | Maguire et al. | |
| 2016/0042341 A1 | 2/2016 | Griffin et al. | |
| 2016/0142402 A1 | 5/2016 | Kim | |
| 2016/0253651 A1 | 9/2016 | Park et al. | |
| 2016/0325391 A1 | 11/2016 | Stampfl et al. | |
| 2016/0344740 A1 | 11/2016 | Choi | |
| 2017/0053506 A1 | 2/2017 | Alexis | |
| 2017/0076520 A1 | 3/2017 | Ho et al. | |
| 2017/0186294 A1 | 6/2017 | Gotanda et al. | |
| 2017/0269167 A1 | 9/2017 | Willey | |
| 2017/0286708 A1 | 10/2017 | Erhart et al. | |
| 2017/0359169 A1 | 12/2017 | Benson et al. | |
| 2018/0114220 A1 | 4/2018 | Ekberg | |
| 2018/0150832 A1 | 5/2018 | Badal-Badalian et al. | |
| 2018/0165480 A1 | 6/2018 | Raju | |
| 2018/0167394 A1 | 6/2018 | High et al. | |
| 2018/0336359 A1 | 11/2018 | Lakhani et al. | |
| 2018/0338241 A1 | 11/2018 | Li | |
| 2018/0375665 A1 | 12/2018 | Contenti et al. | |
| 2019/0114488 A1 | 4/2019 | Glazer et al. | |
| 2019/0130394 A1 | 5/2019 | Stollman et al. | |
| 2019/0215394 A1 | 7/2019 | Torvinen et al. | |
| 2019/0244451 A1 | 8/2019 | Favier et al. | |
| 2019/0253254 A1 | 8/2019 | Brownlee et al. | |
| 2019/0333304 A1 | 10/2019 | Flynn et al. | |
| 2020/0059170 A1 | 2/2020 | Brotto et al. | |
| 2020/0265283 A1 | 8/2020 | Brotto et al. | |
| 2020/0342728 A1 | 10/2020 | Brotto et al. | |
| 2021/0122024 A1* | 4/2021 | Obermann | B25F 5/00 |
| 2021/0152345 A1* | 5/2021 | Beloskur | H04L 9/0844 |
| 2021/0166247 A1 | 6/2021 | Sirigiri et al. | |
| 2022/0024014 A1 | 1/2022 | Obermann et al. | |
| 2022/0156412 A1 | 5/2022 | Davis et al. | |
| 2023/0410580 A1 | 12/2023 | Davis et al. | |

FOREIGN PATENT DOCUMENTS

| | | |
|---|---|---|
| CN | 107209976 A | 9/2017 |
| CN | 107209983 A | 9/2017 |
| CN | 109685665 A | 4/2019 |
| EP | 1125264 B1 | 2/2004 |
| WO | 2015121833 A1 | 8/2015 |
| WO | 2018228973 A1 | 12/2018 |

OTHER PUBLICATIONS

"DeWalt Tool Connect", Available online at: dewalt.com, Nov. 25, 2016, 6 pages.
"Hilti: Internet of Things Services", Available Online at: hilti.com, Sep. 18, 2018, 3 pages.
"Milwaukee One-Key", Available online at: onekey.milwaukeetool.com, 2020, 7 pages.
U.S. Appl. No. 16/779,225, "Notice of Allowance", Apr. 15, 2020, 15 pages.
U.S. Appl. No. 16/779,335, "Final Office Action", Aug. 14, 2020, 25 pages.
U.S. Appl. No. 16/779,335, "Non-Final Office Action", Apr. 1, 2020, 20 pages.
U.S. Appl. No. 16/779,431, "Notice of Allowance", Apr. 27, 2020, 15 pages.
U.S. Appl. No. 16/779,431, "Supplemental Notice of Allowability", Jun. 12, 2020, 3 pages.

(56) References Cited

OTHER PUBLICATIONS

U.S. Appl. No. 16/880,692 , "Non-Final Office Action", Nov. 24, 2021, 26 pages.
U.S. Appl. No. 16/880,692 , "Notice of Allowance", Mar. 31, 2022, 5 pages.
U.S. Appl. No. 16/880,692 , "Supplemental Notice of Allowability", Apr. 20, 2022, 2 pages.
U.S. Appl. No. 16/894,591 , "Non-Final Office Action", Oct. 5, 2021, 8 pages.
U.S. Appl. No. 16/894,591 , "Notice of Allowance", Mar. 2, 2022, 10 pages.
U.S. Appl. No. 17/846,447 , "Notice of Allowance", Aug. 2, 2023, 9 pages.
CA3,165,047 , "Office Action", Mar. 21, 2023, 3 pages.
CA3,165,047 , "Office Action", Dec. 1, 2022, 5 pages.
CA3165047 , "Notice of Allowance", Aug. 15, 2023, 1 page.
CA3165067 , "Notice of Allowance", Apr. 6, 2023, 1 page.
CA3165067 , "Office Action", Nov. 23, 2022, 4 pages.
CN202080095101.5 , "Office Action", Mar. 18, 2023, 26 pages.
CN202080095153.2 , "Notice of Decision to Grant", Apr. 15, 2023, 6 pages.
PCT/US2020/062202 , "International Preliminary Report on Patentability", Aug. 11, 2022, 17 pages.
PCT/US2020/062202 , "International Search Report and Written Opinion", Feb. 24, 2021, 18 pages.
PCT/US2020/062709 , "International Preliminary Report on Patentability", Aug. 11, 2022, 8 pages.
PCT/US2020/062709 , "International Search Report and Written Opinion", Feb. 25, 2021, 9 pages.
CA3,175,770 , "Office Action", Jan. 5, 2024, 5 pages.
EP20916796.4 , "Extended European Search Report", Jan. 3, 2024, 5 pages.
U.S. Appl. No. 17/846,447 , "Supplemental Notice of Allowability", Oct. 31, 2023, 2 pages.

* cited by examiner

SYSTEMS AND TECHNIQUES FOR TRANS-ACCOUNT DEVICE KEY TRANSFER IN BENEFIT DENIAL SYSTEM

CROSS-REFERENCES TO RELATED APPLICATIONS

This application is a continuation of U.S. patent application Ser. No. 17/846,447, filed Jun. 22, 2022, which is a continuation of U.S. Pat. No. 11,391,553 on Jul. 5, 2022, which is a continuation application of U.S. Pat. No. 10,721,224, granted Jul. 21, 2020 and filed Jan. 31, 2020, the entire contents of which are hereby incorporated in its entirety for all purposes.

This application is related to U.S. Pat. No. 10,701,561, granted Jun. 30, 2020, filed Jan. 31, 2020 as well as U.S. application Ser. No. 16/779,335 filed Jan. 31, 2020, which are each herein incorporated by reference in their entirety for all purposes.

BACKGROUND

With advancements in technology, electronic devices can be configured to perform a number of functions (e.g., secondary functions) which are additional to any primary function of the electronic device. An owner of the electronic device may be required to fulfill certain conditions (e.g., registration, etc.) in order to access such secondary functions. While a retailer that initially sells the electronic device may provide an initial purchaser with a means to fulfill those conditions, it does not typically provide such a means to secondhand purchasers. The result is a decrease of the electronic device's value to purchasers who are unable to access the secondary functions of the electronic device.

Embodiments of the invention address these and other problems, individually and collectively.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Techniques described herein are directed to a system and methods for enabling a transfer of access rights for an electronic device between users. For the purposes of this disclosure, access rights for an electronic device refer to an ability to issue commands to the electronic device and have the electronic device execute those commands. Such a command may not be executed unless the command is accompanied by a device key that matches a device key stored in a secure memory of the electronic device. Hence, granting access rights to a user or user device for an electronic device may involve ensuring that the user or user device receives a device key for the electronic device.

In the system described herein, a first user (e.g., a transferor) may, upon determining that access rights should be granted to a second user (e.g., a transferee), generate a transaction record that includes information about the second user. In some embodiments, the transaction record may include a digital signature that can be used to verify the authenticity of the transaction record (e.g., using a cryptographic key associated with the first user). The transaction record may then be provided to a registry network, which may verify the transaction record as well as a current ownership status. Upon verification, the transaction record may be written to an ownership registry and a mobile application server may be notified of the grant of access rights. The mobile application server may then identify an account associated with the second user as well as at least one second user device associated with that account. The mobile application server may also identify a device key associated with the electronic device and may transmit that device key to the second user device to be stored in local memory. Once the device key has been received at the second user device, the second user device may be used to issue commands to the electronic device.

One embodiment of the disclosure is directed to a method comprising receiving, at a first user device operated by a first user, a request to grant access rights to a second user for an electronic device associated with the first user, receiving, by the first user device, information associated with the second user, generating a transaction record that includes at least a portion of the information associated with the second user, and providing the transaction record to a server, wherein upon verifying the transaction record, a device key associated with the electronic device is caused to be provided to a second user device associated with the second user.

Another embodiment of the disclosure is directed to a user device associated with a first user comprising: a processor; and a memory including instructions that, when executed with the processor, cause the user device to, at least: receive a request to grant access rights to a second user for an electronic device associated with the first user, receive information associated with the second user, generate a transaction record that includes at least a portion of the information associated with the second user, and provide the transaction record to a server, wherein upon verification of the transaction record, a device key associated with the electronic device is caused to be provided to a second user device associated with the second user.

Yet another embodiment of the disclosure is directed to a method comprising receiving, at a transferee user device, a request to obtain access rights for an electronic device associated with a transferor user device, providing, to the transferor user device, a request to grant access rights for the electronic device associated with a transferor user device, receiving a device key associated with the electronic device, and storing the device key in association with the electronic device in memory of the transferee user device.

For a fuller understanding of the nature and advantages of the present invention, reference should be made to the ensuing detailed description and accompanying drawings.

BRIEF DESCRIPTION OF THE DRAWINGS

Various embodiments in accordance with the present disclosure will be described with reference to the drawings, in which.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
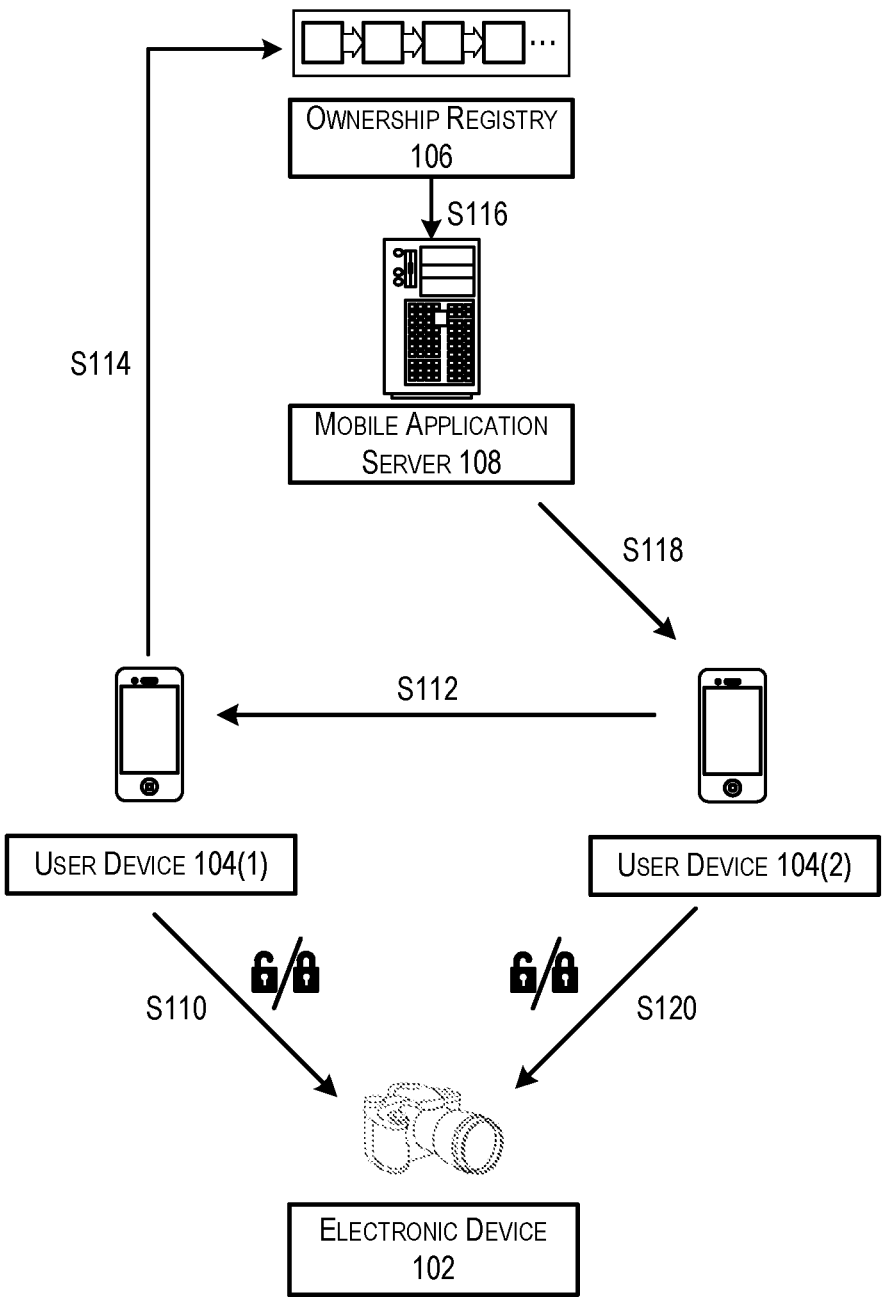
FIG. 1 depicts an illustrative overview of an example system in which a device key capable of being used to issue commands to an electronic device may be transmitted between user devices in accordance with at least some embodiments.

FIG. 1 depicts an illustrative overview of an example system in which a device key capable of being used to issue commands to an electronic device may be transmitted between user devices in accordance with at least some embodiments. In FIG. 1, an electronic device 102 is depicted as communicating with multiple user devices 104. An ownership registry 106 may maintain a record of a current ownership status for the electronic device 102. Each of the user devices 104 (1 and 2) may be associated with different accounts maintained by a mobile application server 108. The mobile application server 108 may maintain a mapping of an identifier for each electronic device 102 to a corresponding device key.

The electronic device 102 may be any suitable device that accomplishes its purpose electronically. The electronic device 102 may have installed within it an electronic circuit which enables it to be locked and/or unlocked. In some embodiments, the electronic circuit may be installed between a power source and other components of the electronic device 102 configured to perform some function, such that the electronic circuit is able to restrict or disrupt power to those components. At least a portion of the electronic circuit may include a secure element which includes encrypted data that cannot readily be accessed outside of the secure element. One or more device keys may be stored within this secure element of the electronic circuit.

An electronic device 102 may be configured to perform multiple functions. In some embodiments, the electronic circuit may be configured to restrict or disrupt certain functions of the multiple functions performable by the electronic device 102, either individually or as a group. Some illustrative examples of an electronic device having an electronic circuit as described herein are described in greater detail with respect to U.S. patent application Ser. No. 16/779,335, entitled "BENEFIT DENIAL SYSTEM FOR SELECTIVELY PREVENTING OPERATION OF POWER TOOLS," which are herein incorporated by reference in their entirety for all purposes. In some embodiments, the electronic circuit may operate using a power source (hereinafter "independent power source") which is separate and/or distinct from the power source of the electronic device 102 itself, enabling an operation to be performed using the electronic circuit even if the electronic device 102 is unpowered (e.g., disconnected from its power source). If, for example, the electronic device 102 is a cordless drill with a removable and replaceable rechargeable battery adapted to power a drilling function, a power source (e.g., compact battery, such as a watch battery) separate and/distinct from the rechargeable battery can be included with the drill and used to power the electronic circuit while the rechargeable battery is removed from the drill. In some cases, the independent power source may be recharged by drawing power from the power source of the electronic device 102. In some embodiments, the electronic circuit may include an inductive coil which enables it to be powered remotely in order to perform an operation.

The user device 104 may be any electronic device capable of establishing a communication session with another device and transmitting/receiving data from that device. A user device 104 may include the ability to download and/or execute mobile applications. User devices may include mobile communication devices as well as personal computers and thin-user devices. By way of illustrative example, a user device may be a smart phone, a personal data assistant (PDA), or any other suitable handheld device.

In some embodiments, the user device 104 may include a communication interface configured to enable communication between the user device and another electronic device (e.g., mobile application server 108, an electronic device 102, another user device 104, and/or a wireless router that manages access to a network). Examples of a suitable communication interface may include radio frequency (RF) transceivers configured to send and receive communications using near-field communications (NFC), or other radio frequency or wireless communication protocols such as Bluetooth, Bluetooth low-energy (BLE), a wireless local area network (e.g., WiFi), iBeacon, etc. A second example of a suitable communication interface may include an optical input device capable of obtaining graphical input, such as a camera device or a barcode reader. In this second example, the user device 104 may be presented with a machine-readable code, which may be scanned using the optical input device in order to obtain data encoded into the machine-readable code. In some embodiments, the communication interface may include both long-range and short-range communication means. For example, the communication interface may include an antenna configured to connect to a cellular network in order to enable communication with various other components of the depicted architecture.

An ownership registry 106 may be any suitable data store which maintains records related to ownership of an electronic device 102. In some embodiments, the ownership registry 106 may be implemented on a blockchain network, which includes a distributed database that maintains a continuously-growing list of records secured from tampering and revision called a blockchain (or blockchain ledger). A blockchain may include a number of blocks of transaction records for a number of users/electronic devices. Each block in the blockchain can also contain a timestamp and a link to a previous block of the blockchain. Stated differently, transaction records in a blockchain may be stored in an ownership registry as a series of "blocks," or permanent files that include a record of a number of transactions occurring over a given period of time. Blocks may be appended to a blockchain by an appropriate node after it completes the block and the block is validated. In embodiments of the invention, a blockchain may be distributed, and a copy of the blockchain may be maintained at each node in a blockchain network. Any node within the blockchain network may subsequently use the blockchain to verify transactions. A node of the blockchain network may be any computing device which is included within the blockchain network. In some embodiments, a mobile application server 108 may also be a node of the blockchain network.

The mobile application server 108 may be any computing device configured to provide remote support for a user device 104. The mobile application server 108 may be associated with a set of computer executable instructions to be installed on, and executed from, the user device 104 (e.g., a mobile application). The mobile application server 108 may provide any suitable service and/or processing for the user device 104. For example, the mobile application server 108 may perform calculations on behalf of the user device 104. In some embodiments, the mobile application server may maintain an account for one or more users. The mobile application server 108 may also store any protocols and/or user preferences related to the operation of the user device.

The mobile application server 108 may be made up of any computer or cluster of computers. For example, the mobile application server 108 can be a large mainframe, a mini-computer cluster, or a group of servers functioning as a unit. The mobile application server 108 may be coupled to a database and may include any hardware, software, other logic, or combination of the preceding for servicing the requests from one or more client computers (e.g., access device 104 and/or user device 104). The mobile application server 108 may comprise one or more computational apparatuses and may use any of a variety of computing structures, arrangements, and compilations for servicing the requests from one or more client computers.

In some embodiments, at least a portion of the functionality performed by a mobile application installed upon, and executed from, the user device 104 may be performed by a mobile application server 108 in communication with the mobile application. For example, upon execution of a mobile application, the user device 104 may establish a communication session with the mobile application server 108 in which at least some processing is performed by the mobile application server 108 on behalf of the mobile application. In some embodiments, the mobile application server 108 may maintain an account associated with the user device and/or its user. The account maintained by the mobile application server 108 may store a number of data elements related to the user. For example, the application server may store user data, information on item (e.g., electronic device) ownership, or any other suitable data. In some embodiments, each account may be associated with a pair of cryptographic keys, such as a public and private cryptographic key pair. Additionally, the mobile application server 108 may maintain a mapping of device keys to electronic devices. The mobile application server may, upon receiving an indication of a transfer of ownership of the electronic device 102, automatically (e.g., without human interaction) identify the device key associated with the electronic device 102 and associate that device key to an account for the new owner. The mobile application server may also automatically identify a user device 104 associated with the new owner (via the stored user data) and may transmit the device key to that user device (e.g., via a push notification). In some embodiments, the device key, once received by the user device, may be used to interact with the electronic device 102 (e.g., to issue lock and/or unlock commands) over a communication channel (e.g., BLUETOOTH™).

A device key may be any suitable string of characters capable of being used to authorize an operation (e.g., a lock or unlock operation) with respect to the electronic device 102. A device key may be unique to a particular electronic device. In other words, each electronic device may be associated with a different device key. In some embodiments, a device key may be a random or pseudo-random string of characters, such that the device key cannot be readily derived from information related to the electronic device. In some embodiments, a device key may be derivable from an identifier for the electronic device. In these embodiments, a device key may be independently generated by any entity that has the prerequisite information (e.g., an entity in possession of the electronic device) and access to an algorithm (which may be secret) for generating such a device key. For example, in some embodiments, a device key may be derived for a particular electronic device by applying a hash function to an identifier for that electronic device. In this example, the identifier for the electronic device may correspond to a Universal Product Code (UPC) and serial number or other identifier. Some electronic devices may include an indication of their respective identifiers (e.g., within a barcode or other machine-readable code associated with the electronic device).

In some embodiments, a first user device 104(1) may acquire a device key for an electronic device from a retailer (or other resource provider) when the electronic device is initially purchased from the retailer. Some illustrative examples of techniques in which a user device may obtain a device key as described herein are described in greater detail with respect to U.S. patent application Ser. No. 16/779,225, entitled "System and Techniques for Secret Key Transfer in Benefit Denial System," which is herein incorporated by reference in its entirety for all purposes. When a current owner of the electronic device 102 wishes to sell, or otherwise transfer ownership of the electronic device, the device key may be provided to the new owner using techniques described herein. This may involve removing the device key from user device 104(1) and providing the device key to a user device 104(2) associated with the new owner.

In some embodiments, a device key stored in an electronic device 102 may be altered or changed. For example, a new owner of an electronic device 102 may, upon completing a purchase for the electronic device and receiving the device key, replace or overwrite the existing device key with a new device key. The replacement device key may be of his or her choosing or it may be random or pseudo-random (e.g., selected by the mobile application). Note that an operation to replace or overwrite an existing device key may require that the current device key be provided. In some embodiments, an electronic device 102 may include multiple device keys, each of which may be specific to the electronic device 102. For example, a single electronic device 102 may include two separate device keys, where a first device key may be provided to a purchaser of the electronic device 102 (and which may be replaced) and a second device key which may be stored by the resource provider and/or mobile application server 108 without being provided to the purchaser (i.e., a master key).

By way of illustrating interactions between various components of the system described herein, consider the following scenario. In the illustrated scenario, a first user having user device 104(1) may be capable of using a device key stored locally on user device 104(1) to interact with the electronic device 102 at S110. This user may wish to transfer an ownership interest in (e.g., sell or give) the electronic device 102 to a second user having a second user device 104(2).

In this example, the first user may obtain information about the second user to be used in the transfer at S112. For example, the second user may provide an identifier that may be used to uniquely identify an account associated with the second user. In some cases, the second user may also provide a public key (of a public-private cryptographic key pair) associated with the second user. In some cases, the information about the second user may be transmitted via a communication session opened between the first user device 104(1) and the second user device 104(2).

Upon receiving the information about the second user from the user device 104(2), the user device 104(1) may generate a transfer of ownership transaction record. The generated transaction record may be signed using a private key (of a cryptographic key pair) associated with the current owner, and may include an identifier for the electronic device 102 as well as at least a portion of the information associated with the second user. For example, the transaction record may include an identifier for the second user and/or a public key for the second user. As depicted at S114, this transaction record may be written to an ownership registry 106. However, note that in some embodiments, the transaction record may be provided directly to the mobile application server 108.

Upon receiving the transaction record, and before the transaction record can be written to the ownership registry 106, a computing node of a network which maintains the ownership registry 106 may verify the authenticity of the transaction record as well as that the owner of the user device 104(1) is the current owner of the electronic device 102. To do this, the computing node may verify an electronic signature for the transaction record. To verify the electronic signature, the computing node may perform a cryptographic operation on the signed data and compared the result to an expected data. If the signed data matches the expected data, then the transaction record may be considered verified. This may also verify that the operator of the user device 104(1) is the current owner of the electronic device 102, since that user device 104(1) must be in possession of the private cryptographic key used to create the electronic signature. In some cases, the computing node may identify the latest transaction record stored in the ownership registry related to the electronic device 102. Upon retrieving that transaction record, the computing node may use a public key indicated in that transaction record to verify the current electronic signature. Once the transaction record (and current ownership status) has been verified, the transaction record is added to the ownership registry.

Upon verifying the authenticity and ownership of the transaction record and recording the transaction record to the ownership registry 106, the mobile application server 108 may receive an indication of the transaction at S116. In some embodiments, the mobile application server 108 may be notified via a notification module which monitors transaction records recorded to the ownership registry 106. In some embodiments, upon receiving an indication of the transfer of ownership, the mobile application server 108 may identify an account associated with each of the user devices 104 as well as a device key associated with the electronic device 102. In some embodiments, this may involve performing a query on a device identifier associated with each of the user devices 104. The mobile application server 108 may then identify contact information for each of the devices stored in relation to the respective accounts. In some embodiments, one or both of the user devices 104 may not be associated with an account maintained by the mobile application server 108. In those embodiments, the mobile application server 108 may identify contact information for the user devices 104 from the transaction record recorded to the ownership registry 106.

Upon identifying the contact information for at least the user device 104(2), the mobile application server 108 may transmit the device key associated with the electronic device 102 to the user device 104(2) at S118. In some embodiments, the device key may be transmitted to the user device 104(2) via a push notification (e.g., a push update). The device key may be stored in a secure memory of the user device 104(2). In some embodiments, the device key may be encrypted. In these embodiments, the device key may be encrypted by the mobile application server 108 prior to being provided to the user device 104(2) or the device key may be encrypted by the user device 104(2) prior to being stored in memory. Upon receiving the device key, the user device 104(2) may issue commands to the electronic device 102 using the device key at S120. The electronic device 102 may include circuitry configured to allow compliance with such commands only if the device key associated with the electronic device 102 was received by the user device 104(2).

In some embodiments, the mobile application server 108 may also cause the device key to be removed from the memory of the user device 104(1), preventing it from being able to issue commands to the electronic device 102 in the future or preventing the electronic device 102 from complying with such commands. In some embodiments, this may involve the mobile application server 108 providing instructions to the user device 104(1) which cause the device key associated with the electronic device 102 to be deleted, or otherwise removed, from memory.

In some embodiments, there may be no need to remove the device key from the memory of the user device 104(1) in order to prevent the device key from being used to issue commands to the electronic device 102. For example, in some embodiments, the user device 104(2), upon receiving the device key and upon establishing a communication session with the electronic device 102, may cause the current device key to be replaced with a new device key. It is envisioned that to do this, one may need to be in possession of the current device key. Once the device key has been replaced with a new device key, that new device key may then be transmitted to the mobile application server 108, which may subsequently store the new device key for future reference. By way of a second example, in some embodiments, the mobile application server may, when providing the device key to the user device 104(2), provide an encrypted data packet. This encrypted data packet may include the device key as well as a dynamic data element which can be used to validate the data packet. For example, the mobile application server 108 may compile a data packet which includes the device key along with a counter value (e.g., a value which is incremented or decremented upon each ownership transfer) which is encrypted in a manner such that it can only be decrypted by the electronic device 102. Upon receiving the encrypted data packet with the counter value, the electronic device 102 may verify that the counter value is greater than (or less than) the previously-used counter value and may update a current counter value stored in the electronic device to match that received in the latest encrypted data packet. In this example, only data packets which include a counter value greater than or equal to the currently-stored counter value may be validated when executing a command received with the data packet.

In some embodiments, the mobile application server 108 may compile a data packet which includes the device key along with an identifier for the user device 104(2). In this example, the electronic device 102 may be associated with its own cryptographic key pair (e.g., a private and public cryptographic key). The mobile application server 108 may then encrypt the data packet using the public cryptographic key associated with the electronic device 102. This would prevent the information in the data packet from being accessed by the user device 104(2) despite the encrypted packet being stored in memory of the user device 104(2) since that information can only be accessed by the electronic device 102 having possession of the private cryptographic key. In these embodiments, the user device 104(2) upon issuing a command to the electronic device 102 at S120, would provide the encrypted data packet to the electronic device 102 along with the command to be executed. The electronic device 102 would then decrypt the encrypted packet using its private cryptographic key, verify the device key, verify that the device identifier for the user device 104(2) matches the device identifier associated with the user device 104(2) from which the command was issued, and execute the command upon verification. One skilled in the art, after reading this disclosure, would recognize that these embodiments of the system would prevent commands from being issued by user devices which have not been authorized by the mobile application server 108 even if those user devices gain possession of the encrypted data packet that includes the device key.

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communication protocol.

Figure 2:
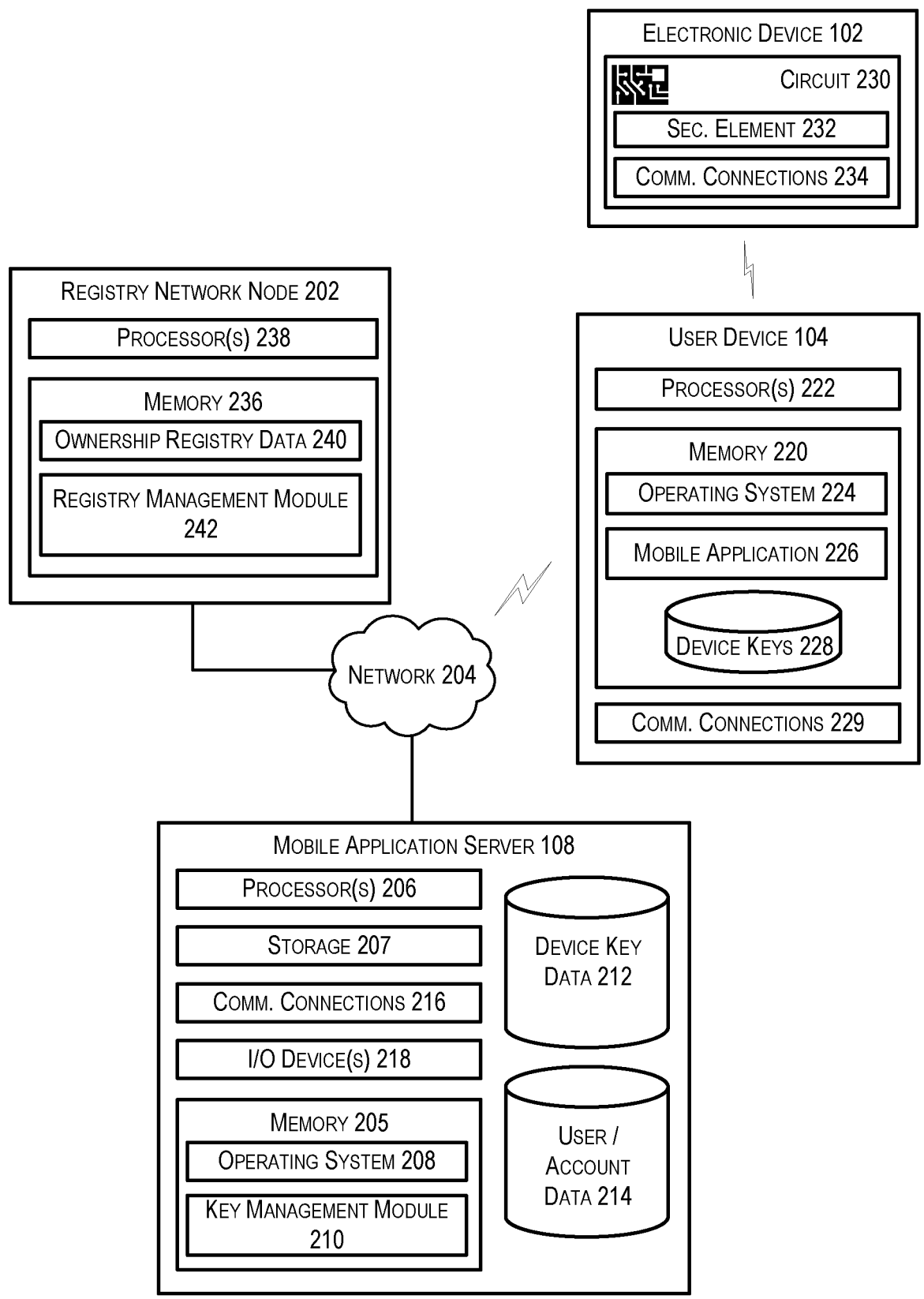
FIG. 2 depicts an example system architecture for a system that may be implemented to perform the functionality described in accordance with at least some embodiments.

FIG. 2 depicts an example system architecture for a system that may be implemented to perform the functionality described in accordance with at least some embodiments. As depicted in FIG. 2, an exemplary architecture may include an electronic device 102, one or more user devices 104, and a mobile application server 108 as described with respect to FIG. 1 above. Additionally, the system may include a number of registry network nodes 202, which form a registry network. One or more of these components may communicate either directly or over a network 204.

The mobile application server 108 may be any type of computing device configured to perform at least a portion of the functionality described herein. In some embodiments, the mobile application server 108 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the mobile application server 108 may include at least one memory 205 and one or more processing units (or processor(s)) 206. The processor(s) 206 may be implemented as appropriate in hardware, computer-executable instructions, firmware or combinations thereof. Computer-executable instruction or firmware implementations of the processor(s) 206 may include computer-executable or machine executable instructions written in any suitable programming language to perform the various functions described. The mobile application server 108 may also include additional storage 207.

The memory 205 may store program instructions that are loadable and executable on the processor(s) 206, as well as data generated during the execution of these programs. Depending on the configuration and type of mobile application server 108, the memory 205 may be volatile (such as random access memory (RAM)) and/or non-volatile (such as read-only memory (ROM), flash memory, etc.). The mobile application server 108 may also include additional storage 207, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 205 may include multiple different types of memory, such as static random access memory (SRAM), dynamic random access memory (DRAM) or ROM. Turning to the contents of the memory 205 in more detail, the memory 205 may include an operating system 208 and one or more application programs or services for implementing the features disclosed herein including at least a module for distributing device keys to appropriate user devices (key management module 210). The memory 205 may also include device key data 212, which provides mappings of device keys to particular electronic devices, as well as user account data 214, which provides information related to users and user accounts (e.g., demographic data as well as user devices and contact information, associated electronic devices, etc.). In some embodiments, the device key data 212 and/or user account data 214 may be stored in a database.

The memory 205 and the additional storage 207, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are installed on and/or executed from the mobile application server 108. The mobile application server 108 may also contain communications connection(s) 216 that allow the mobile application server 108 to communicate with a stored database, another computing device or server, user terminals, and/or other components of the described system. The mobile application server 108 may also include input/output (I/O) device(s) and/or ports 218, such as for enabling connection with a keyboard, a mouse, a pen, a voice input device, a touch input device, a display, speakers, a printer, etc.

In some embodiments, the key management module 210 may be configured to, in conjunction with the processors 206, provide device keys to user devices which are determined to be associated with an electronic device. In some embodiments, the mobile application server 108 may receive an indication that a particular electronic device 102 is now associated with a particular user account (e.g., via a registry management module 242 executed on a registry network node 202). Upon receiving this indication, the key management module 210 may create an association between the electronic device and the account. The key management module 210 may also identify, from the user/account data 214, one or more user device 104 which is associated with the indicated user account. The key management module 210 may also identify, from the device key data 212, a device key associated with the indicated electronic device 102. The key management module 210 may then transmit the identified device key to the identified one or more user devices 104. In some embodiments, this may be done via a push notification.

In some embodiments, the key management module 210 may be configured to receive a request for a transfer of ownership rights related to an electronic device 102. In these embodiments, the request may include a device identifier for the electronic device 102 as well as information about an operator of the user device 104. The key management module 210 may identify a current owner of the electronic device 102 as well as contact information for that current owner. The key management module 210 may then communicate the received request to the current owner via the identified contact information. In some embodiments, the received request may include an offer for purchase and/or payment credentials to be used in completing a transaction. Note that the transfer of ownership rights may pertain to a temporary transfer of ownership rights (e.g., a rental) for the electronic device. Once the request has been received at the user device associated with the current owner, the transfer of ownership rights may be handled as described elsewhere.

In some embodiments, the key management module 210 may additionally identify a cryptographic key and/or dynamic data associated with the electronic device 102. The key management module 210 may be configured to compile a data packet which includes the device key for the electronic device 102 as well as dynamic data. For example, the key management module 210 may identify a current counter value associated with the electronic device 102. Additionally, the key management module 210 may include an identifier for the user device 104 into the data packet. The key management module 210 may then encrypt the data packet using the identified cryptographic key, such that the data packet may only be decrypted by the electronic device 102. The key management module 210 may then provide the encrypted data packet to the user device 104.

In some embodiments, the user device 104 may comprise any portable electronic device capable of performing the functions disclosed herein as being attributed to the user device 104. The user device 104 may include a memory 220 (e.g., a computer-readable storage medium) storing instructions that, when executed by a processor 222 of the user device 104, enable the user device 104 to perform its intended functions. Turning to the contents of the memory 220 in more detail, the memory 220 may include an operating system 224 that provides executable program instructions for the general administration and operation of the user device 104, and at least a mobile application 226 configured to cause the user device 104 to communicate with the mobile application server 108 in order to receive and utilize device keys. The memory 224 may include a number of device keys 228 associated with electronic devices. Note that the device keys 228 stored in memory of the user device 104 may be encrypted. In some cases, the device keys 228 may be included within encrypted data packets which cannot be decrypted by the user device 104. Additionally, the user device 104 may include a number of communication connections 229 which enable the user device 104 to communicate with other electronic devices. The communication connections 229 may include wireless or direct physical connections. Additionally, wireless connections may include any combination of short-range or long-range wireless protocols.

In some embodiments, the mobile application 226 may be configured to, in conjunction with a processor 222, facilitate a transfer of ownership of an electronic device to or from an operator of the user device 104. To facilitate a transfer of ownership of the electronic device 102 away from an operator of the user device 104, the mobile application 226 may be configured to receive information about the electronic device 102 (e.g., a device identifier) as well as information about the user to which ownership of the electronic device should be transferred. In some embodiments, at least a portion of this information may be manually input (e.g., via a GUI). In some embodiments, at least a portion of this information may be electronically input. For example, the user of the user device 104 may scan a barcode or other machine readable code that includes at least a portion of the information (e.g., a barcode for the electronic device or a barcode presented by the transferee). In some embodiments, the user device 104 may receive information about a transferee from the mobile application server 108 (e.g., upon receiving a request for a transfer of ownership from a potential transferee). Once the mobile application 226 has received the required information, it may complete an ownership transfer transaction. In some embodiments, this may involve generating a transaction record that includes the received information and causing that transaction record to be written to an ownership registry maintained on a registry network. The mobile application 226 may electronically sign the transaction record using a cryptographic key so that the transaction record can be verified. In some embodiments, each mobile application 226 may be associated with a separate pair of cryptographic keys (e.g., private and public cryptographic keys) which may be used to encrypt messages to the mobile application 226 as well as to sign transaction records by the mobile application 226. In some embodiments, the mobile application 226 may be configured to provide the transaction record to the ownership registry upon completion of a financial transaction, for example, upon receiving authorization of a payment transaction from the transferee. In some embodiments, the mobile application 226 may be configured to automatically (e.g., absent any further instruction) delete or otherwise remove a device key for an electronic device from the stored device keys 228 upon completion of a transfer of ownership of the electronic device 102 away from the operator of the user device 104.

To facilitate a transfer of ownership of the electronic device to an operator of the user device 104, the mobile application 226 may be configured to convey information about the operator of the user device 104 to a user device currently associated with the electronic device 102. In some embodiments, the user device 104 of a user to whom an electronic device 102 will be transferred may detect the electronic device 102 within its vicinity (e.g., via a wireless connection) and such a user may request to purchase or rent the detected electronic device 102. In these embodiments, the mobile application 226 may communicate a request for a transfer of ownership rights (or rental) to the mobile application server 108, which may convey that request to a current owner of the electronic device 102. In some embodiments, the mobile application 226 may provide information to be used in a transfer of ownership for the electronic device directly to a current owner of the electronic device. For example, the mobile application 226 may cause the user device 104 to establish communication with a second user device 104 which is operated by a current owner of the electronic device 102. The mobile application 226 may further cause the user device 104 of the user requesting an ownership transfer to transmit information about the operator of the user device 104 to the second user device via that connection. In a second example, the mobile application 226 may cause the user device 104 of the user requesting an ownership transfer to compile a machine-readable code which includes information about the user, which can then be scanned using an optical reader installed within the second user device. In some embodiments, to facilitate the transfer of ownership of the electronic device 102 to an operator of the user device 104, the mobile application 226 may provide a public cryptographic key associated with an account maintained by an operator of the user device 104 to the second user device, so that the public cryptographic key can be included within a transaction record.

The mobile application 226 may be further configured to cause the user device 104 to issue commands to an electronic device 102 using a device key associated with that electronic device 102. In some embodiments, the mobile application 226 may include a graphical user interface (GUI) which enables a user to interact with the mobile application 226. The mobile application 226 may present to a user of the user device, via the GUI, one or more of a list of devices detected by the user device 104, a list of electronic devices associated with the user (e.g., electronic devices for which the user device 104 has received a device key), a current status of one or more electronic devices, and/or commands available for an electronic device. The mobile application 226 may be configured to receive user input via the GUI and issue commands to an electronic device based on the received user input. For example, the user may select an option to lock or unlock a particular electronic device via the GUI. In this example, the mobile application 226 may cause the user device 104 to transmit a corresponding lock or unlock command to the electronic device 102 that includes the device key for that electronic device. In some embodiments, the mobile application 226 may receive, in response to the transmitted command, a status update for the electronic device 102.

The electronic device 102 may be any suitable electronic device having installed within it an electronic circuit 230 as described herein. As described elsewhere, the electronic circuit 230 may be installed between a power source and other components of the electronic device 102 which are configured to perform some function, such that the electronic circuit 230 is able to restrict or disrupt power to those components in order to manage the ability of the electronic device 102 to perform the function. At least a portion of the electronic circuit 230 may include a secure element 232 which includes an encrypted memory. One or more device keys may be stored within the secure element 232 of the electronic circuit. In some embodiments, processors within the circuit (and potentially within the secure element 232) may be capable of decrypting device key information in order to process commands received from a user device 104. Additionally, the electronic device 102 may include a number of communication connections 234 which enable the electronic device 102 to communicate with other devices. The communication connections 234 may include wireless or direct physical connections. Additionally, wireless connections may include any combination of short-range or long-range wireless protocols.

The registry network node 202 may be any suitable computing system or component within a registry network. A registry network node 202 may be configured to perform registry update/verification actions in accordance with embodiments described herein. In some embodiments, a registry network may be a blockchain network which includes a distributed environment implemented across number of registry network nodes 202. In some embodiments, the mobile application server 108 may also be a registry network node. The registry network node 202 may include a memory 236 (e.g., a computer-readable storage medium) storing instructions that, when executed by a processor 238 of the registry network node 202, enable the registry network node 202 to perform its intended functions. Turning to the contents of the memory 236 in more detail, the memory 236 may include a local copy of ownership registry data 240 as well as a module for managing registry data (registry management module 242).

In some embodiments, the registry management module 242 may be configured to, in conjunction with a processor 238, update ownership registry data 240 to include received transaction records. In some embodiments, the registry management module 242 may receive a transaction record from a user device 104 that includes at least an electronic device identifier. The registry management module 242 may, upon receiving that transaction record, verify that the originator of the transaction record is the current owner of the electronic device. This may involve identifying the latest transaction record currently in the ownership registry data 240 and determining whether the information included within that transaction record matches information for the originator of the transaction record. In some embodiments, the received transaction record may include an electronic signature which includes data within the transaction record which has been obfuscated using a private key associated with the originator of the transaction record. To verify such an ownership registry, the registry management module 242 may identify a public key associated with the originator of the transaction record and use it to restore the data within the transaction record. If the restored data matches the data within the transaction record, then it typically serves as evidence that the signer (e.g., the originator of the transaction record) is in possession of the private cryptographic key. In some embodiments, the registry management module 242 may identify a public cryptographic key associated with the current owner from the latest transaction record currently in the ownership registry data 240 and may use that public cryptographic key to verify the electronic signature. In these embodiments, a transaction record written to the ownership registry data 240 may include a public cryptographic key associated with the intended transferee.

Additionally, the registry management module 242 may be configured to provide a notification to a mobile application server 108 upon the successful addition of a transaction record to the ownership registry data 240. In some cases, ownership registry data 240 may generally pertain to ownership of electronic devices that span multiple mobile application servers 108. For example, an ownership registry may be manufacturer-specific (e.g., maintained for electronic devices manufactured by a particular manufacturer) and a number of mobile application servers 108 may each be associated with a different retailer that sells the electronic devices. In embodiments in which multiple mobile application servers are associated with the ownership registry data 240, the registry management module 242 may be configured to identify the mobile application server 108 associated with a particular electronic device 102. In some cases, the mobile application server 108 may be identified from a latest transaction record for an electronic device as being associated with (e.g., maintaining an account for) a current owner of the electronic device. Upon identifying an appropriate mobile application server 108 for a successfully added transaction record, the registry management module 242 may be configured to provide a notification to that mobile application server 108 related to that transaction record.

In some embodiments, the communication network 204 may include any one or a combination of many different types of networks, such as cable networks, the Internet, wireless networks, cellular networks, and other private and/or public networks. In addition, the communication network 204 may comprise multiple different networks. For example, the user device 104 may utilize a 3G network to communicate with a wireless router, which may then route the communication over a public network (e.g., the Internet) to the mobile application server 108.

Figure 3B:
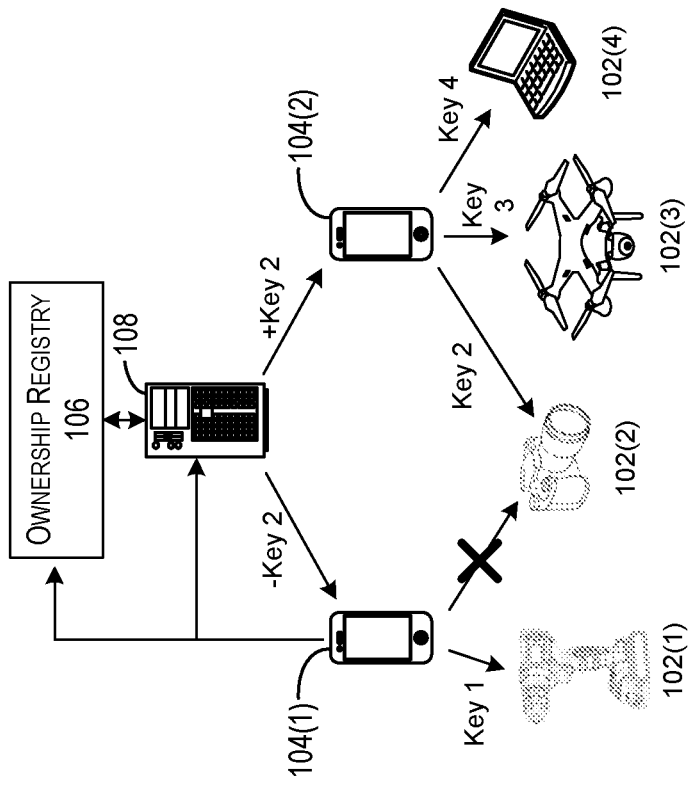
FIG. 3B depicts a state during and subsequent to the transfer of command execution authority for an electronic device.
Figure 3A:
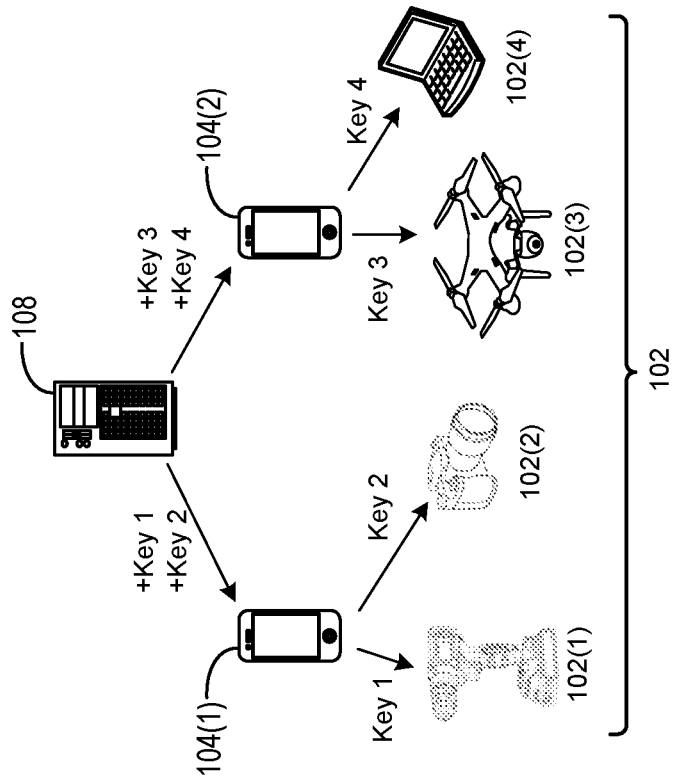
FIG. 3A depicts a state prior to the transfer of command execution authority for an electronic device.

FIGS. 3A and 3B depict an illustrative example in which command execution authority for an electronic device is transferred between accounts in accordance with at least some embodiments. In order to illustrate this example. FIG. 3A depicts a state prior to the transfer of command execution authority for an electronic device, and FIG. 3B depicts a state during and subsequent to the transfer of command execution authority for an electronic device. In each of these respective states, a mobile application server 108 is depicted in communication with multiple user devices 104 (e.g., user devices 104(1-2)). The multiple user devices 104 are further depicted as being in communication with a number of electronic devices 102 (e.g., electronic devices 102(1-4)).

As depicted at 3A, the mobile application server 108 may provide device keys to each user device 104 based on which electronic devices are associated with that user device. For example, upon determining that the operator of the user device 104(1) is the current owner of both electronic device 102(1) and electronic device 102(2), the mobile application server 108 may provide corresponding device key 1 (key 1) and device key 2 (key 2) to the user device 104(1). Likewise, upon determining that the operator of the user device 104(2) is the current owner of both electronic device 102(3) and electronic device 102(4), the mobile application server 108 may provide corresponding device key 3 (key 3) and device key 4 (key 4) to the user device 104(2). Each user device 104 may store the respective keys within a mapping to a device identifier for a respective electronic device.

Each of the user devices 104 may be capable of detecting, and receiving an electronic device identifier from, each of the electronic devices 102. In some embodiments, each user device may automatically detect electronic devices 102 that are within a wireless communication range of the respective user device 104. However, regardless of whether the user device 104 is able to detect or communicate with each electronic device 102, that electronic device may be configured to only execute commands that: (1) include a valid device key or (2) are confirmed by the electronic device to have been sent by a user device 104 that has a valid device key. Accordingly, each user device 104 is only able to issue commands to an electronic device 102 for which it maintains a corresponding device key. Hence, in the depicted example, command execution authority for an electronic device is only available to a user device associated with a current owner of the respective electronic device.

As depicted at 3B, a user device 104(1) may transfer its command execution authority for an electronic device 102(2) to a second user device 104(2). As described elsewhere, this may involve communicating with either the mobile application server 108 or an ownership registry network 106. In embodiments in which the user device 104(1) communicates with the mobile application server 108, the mobile application server 108 may generate a transaction record which it may provide to the ownership registry network to be appended to a current ownership registry. In embodiments in which the user device 104(1) communicates with the ownership registry network 106, the user device 104(1) may generate a transaction record which it may provide to the ownership registry network 106 to be appended to a current ownership registry. The ownership registry network 106 may subsequently notify the mobile application server 108 of the transfer. As noted elsewhere, the transaction record may include a number of details related to the transferee (i.e., the user to whom command execution authority is being transferred) as well as an electronic signature. The electronic signature may be generated by the user device 104(1) using a private key associated with the user device 104(1) or it may be generated by the mobile application server 108 using a private key associated with the mobile application server 108 depending on which entity created the transaction record.

Once a transfer of command execution authority for an electronic device 102(2) to a second user device 104(2) has been completed, the mobile application server 108 may provide the device key corresponding to electronic device 102(2) (key 2) to the user device 104(2). In some embodiments, the mobile application server 108 may transmit instructions to the user device 104(1) which cause key 2 to be deleted from memory of the user device 104(1). In some cases, key 2 may be removed automatically from memory of the user device 104(1) upon completion of the transfer of command execution authority for the electronic device 102(2). In this way, user device 104(2) may be made capable of issuing commands to electronic device 102(2) and user device 104(2) may be made incapable of issuing commands to electronic device 102(2). In some embodiments, upon completion of the transfer of command execution authority for the electronic device 102(2), the user device 104(2) may cause key 2 to be replaced or changed within the memory of the electronic device 102(2).

Figure 4:
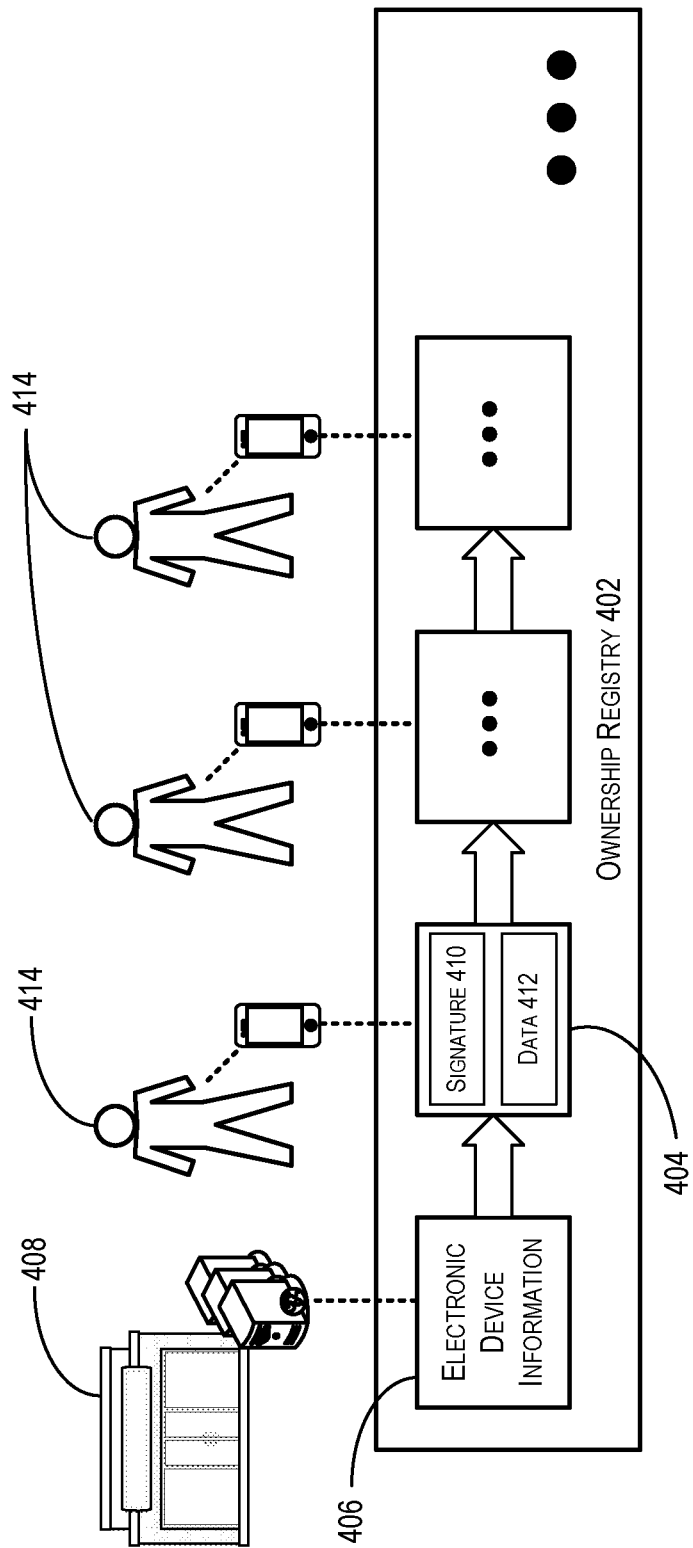
FIG. 4 depicts an example ownership registry that may be implemented in relation to an electronic device in accordance with at least some embodiments of the disclosure.

FIG. 4 depicts an example ownership registry that may be implemented in relation to an electronic device in accordance with at least some embodiments of the disclosure. In FIG. 4, an ownership registry 402, may comprise a record of transaction records 404 related to a particular item (e.g., an electronic device) which is distributed across a blockchain network. In some embodiments, the ownership registry 402 may comprise a blockchain ledger, in which a number of transaction records related to various item transactions are processed in a "block," the record of which is then distributed to a number of computing nodes of the blockchain network.

As described above, a number of transaction records 404 may be associated with an ownership registry 402. The ownership registry 402 may include electronic device information 406, which may be formatted as having at least an electronic device identifier. In some embodiments, the electronic device identifier may be generated using electronic device information provided via a user device (e.g., one of the user devices 104 described herein) or during an electronic device enrollment process. In some embodiments, the electronic device identifier may be generated according to a specified format using information related to the electronic device (e.g., one of the electronic devices 102 described herein). For example, the electronic device identifier may be generated as some combination of item type and serial number. In some embodiments, the electronic device information 406 included within the ownership registry 402 may be generated by a resource provider 408 that initially supplies, distributes, or sells (e.g., at retail) the electronic device (e.g., a merchant or manufacturer).

As users conduct transactions with respect to various electronic devices, user devices associated with those users may generate requests and transmit them to the ownership registry network to be added to the ownership registry. Upon verification of a new transaction record, that new transaction record may be generated and appended to the ownership registry 402. In some embodiments, each transaction record appended to the ownership registry 402 may include an electronic signature 410 that may be used to verify the authenticity of the transaction record. The transaction record 404 may also include transaction data 412. In some embodiments, the transaction data 412 included in a transaction record 404 may include information related to the transaction conducted, the user/users conducting the transaction, contact information for a user, a public cryptographic key associated with a user, or any other suitable information. In some embodiments, the electronic signature 410 may include a portion of the data 412 which has been obfuscated using a private cryptographic key associated with a user.

As transactions are conducted with respect to the ownership registry 402, a transaction record is generated for that transaction and appended to the ownership registry, such that the ownership registry may constitute an unalterable history of the ownership interests for a number of electronic devices. In some embodiments, the transaction record may be generated and signed by a user 414 and provided to an ownership registry network node, which adds the transaction record to the ownership registry 402. In some embodiments, transaction records may be generated by, and signed by, a mobile application server on behalf of users 414. For example, in some embodiments of the system described herein, a first user may provide an indication that an ownership interest in an electronic device currently associated with his or her account should be conveyed to a second user. In this example, the mobile application server may, upon authenticating the first and second users (e.g., via login credentials) generate a transaction record to be appended to the ownership registry 402.

As previously noted, each transaction record may be signed using a private key to create a signature 410 for the transaction record. In some embodiments, the transaction record may be signed by a mobile application server or a registry network node of the ownership registry network using a private key associated with the mobile application server or ownership registry network. In this way, the transaction record may be verified using a public key associated with the mobile application server or ownership registry network. In some embodiments, a transaction record may be signed by one of the parties 414 to a transaction (e.g., the current owner) using a private key associated with that party. In this way, the public key associated with the party may be obtained (e.g., from a repository of public keys or from a latest transaction record associated with the electronic device at issue) and used to verify the authenticity of the transaction record.

Figure 5:
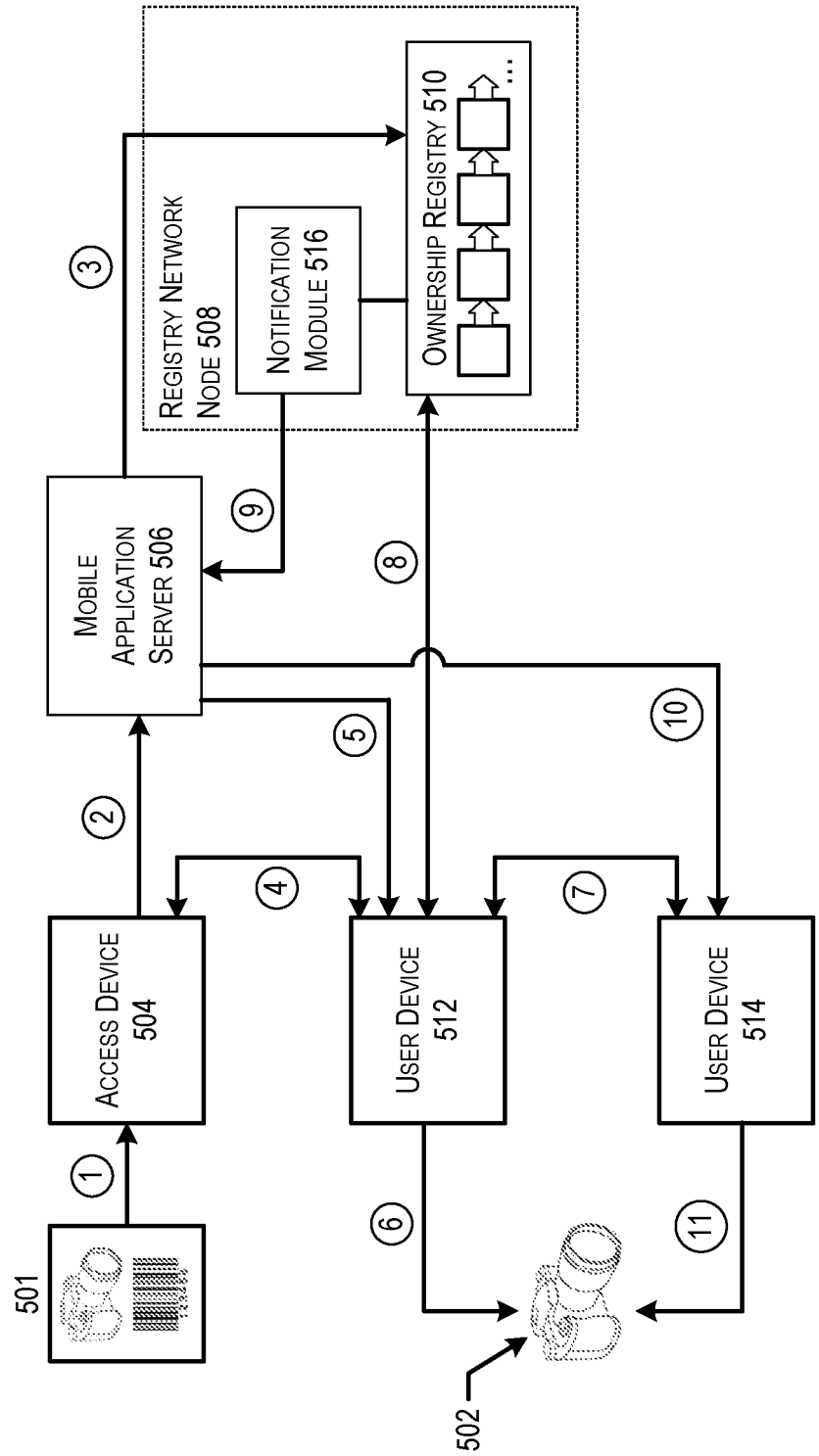
FIG. 5 depicts a process for transferring a device key between accounts in accordance with at least some embodiments.

FIG. 5 depicts a process for transferring a device key between accounts in accordance with at least some embodiments. Some or all of the process 500 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 500 of FIG. 5 may be performed by at least some of the components described in relation to FIG. 2. The code may be stored on a computer-readable storage medium, for example, in the form of a computer program including a plurality of instructions executable by one or more processors. The computer-readable storage medium may be non-transitory.

As depicted in step 1, the process 500 may involve receiving (e.g., via electronic, magnetic, or optical scanning) an indication 501 (e.g., a serial number, UPC code, device identifier, bar code, QR code and/or image information) of an electronic device 502 at an access device 504. For example, a user may present an electronic device 502 for purchase at the access device 504 (e.g., a point-of-sale (POS) device), and the access device 504 may determine (via scanning or otherwise) from the indication 501 which electronic device 502 is being purchased. The access device 504, upon receiving the indication 501 of the electronic device 502 may conduct a transaction in relation to the electronic device 502 to transfer an ownership interest in the electronic device 502 to the user.

Upon completing the transaction to transfer an ownership interest in the electronic device 502 to the user, the access device 504 may convey an indication of that transaction to a mobile application server 506 at step 2. In some embodiments, the access device 504 may provide a device identifier for the electronic device 502 as well as information related to the purchaser of the electronic device 502. The mobile application server 506, upon receiving this information, may identify a device key associated with the electronic device. In some embodiments, the mobile application server 506 may provide the device key to the access device 504 or another user device in vicinity of the access device 504. In these embodiments, the access device 504 may be configured to establish a connection with the electronic device 502 to unlock it using the provided device key.

As depicted at step 3, the mobile application server 506 may cause a registry network node 508 to append a transaction record to an ownership registry 510 indicating the transfer of ownership in the electronic device 502. In some embodiments, the mobile application server 506 may create an initial transaction record for the electronic device 502. In these embodiments, the existence of such a transaction record may be indicative of a valid sale of the electronic device.

A user device 512 associated with the purchaser of the electronic device may then be provided with a device key associated with the electronic device 502. In some embodiments, as depicted at step 4, the device key may be provided to the user device 512 by the access device 504. For example, the device key may be encoded within a machine-readable code which is printed on a receipt by the access device 504. In some embodiments, as depicted at step 5, the device key may be provided to the user device 512 by the mobile application server 506. For example, the access device 504 may provide information about the purchaser of the electronic device 502 to the mobile application server 506. The mobile application server 506 may then identify an account associated with the user based on the provided information. The mobile application server 506 may then provide the device key to the user device 512 via contact information stored in relation to the identified account. Upon receiving the device key, the user device 512 is able to provide commands to the electronic device 502 using the device key at step 6.

Process 500 may continue when the user associated with user device 512 decides to transfer to a second user his or her ability to issue commands to the electronic device 502. In some embodiments, the current user may collect information about the second user to be used in the transaction. This may involve an interaction at step 7 between the user device 512 and a second user device 514 operated by the second user in which information about the second user is obtained by the user device 512.

As depicted at step 8, the user device 512 may cause a new transaction record to be appended to the ownership registry 510 at step 8. In some embodiments, the transaction record may include an indication of the second user (and potentially a public cryptographic key associated with the second user). The transaction record may also include an electronic signature of the user associated with the user device 512 which can be used to verify the authenticity of the transaction record. In some embodiments, upon receiving the transaction record, the registry network node 508 may append the transaction record to the ownership registry upon verifying its authenticity.

Once the ownership registry 510 has been updated to include the new transaction record, a notification module 516 which monitors the ownership registry may notify the mobile application server 506 of the transaction at step 9. The mobile application server 506, upon being notified of the new transaction, may identify an account associated with the second user, and subsequently a user device 514 associated with that account. The mobile application server 506 may then provide the device key associated with the electronic device 502 to the user device 514 at step 10. Upon receiving the device key, the user device 514 is able to provide commands to the electronic device 502 using the device key at step 11.

Figure 6:
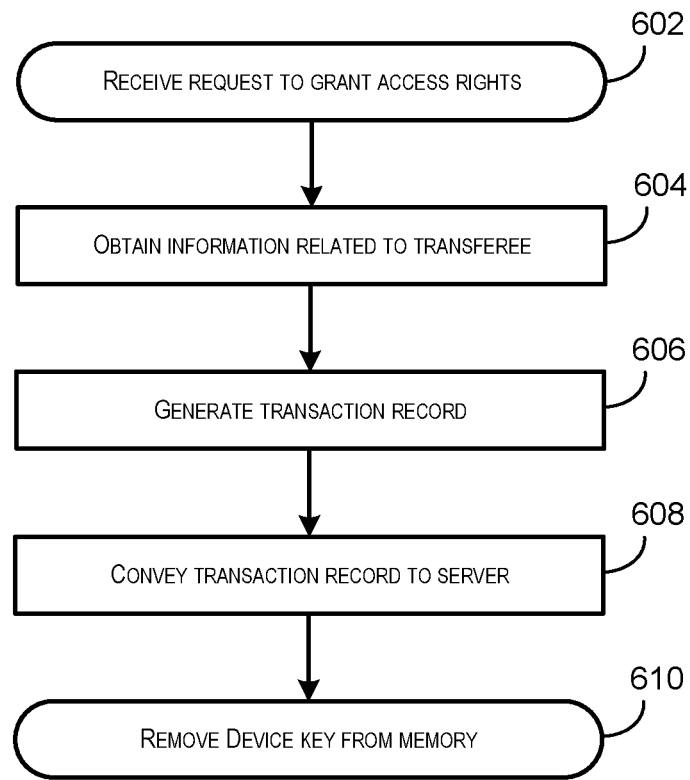
FIG. 6 depicts a flow diagram illustrating a process for granting access rights for an electronic device from a first user device to a second user device in accordance with at least some embodiments.

FIG. 6 depicts a flow diagram illustrating a process for granting access rights for an electronic device from a first user device to a second user device in accordance with at least some embodiments. The process 600 of FIG. 6 may be performed by at least the user device 104 described with respect to FIG. 2. More particularly, process 600 of FIG. 6 is depicted as being performed by a user device currently associated with the electronic device.

Process 600 may begin at 602 when a request is received at a first user device (e.g., a transferor user device) to grant access rights to an electronic device which is currently associated with the first user device.

At 604, the process 600 may involve obtaining information related to a second user (e.g., a transferee). The information related to the second user may include at least an identifier for the second user. In some embodiments, the information related to the second user may include a public cryptographic key associated with that second user or associated with an account maintained in relation to that second user. In some embodiments, the information associated with the second user may be received via manual input through a graphical user interface executed on the user device. In some embodiments, the information associated with the second user may be received from the second user device. For example, the information associated with the second user may be encoded within a machine-readable code by the second user device and may be received upon the user device scanning the machine-readable code. In a second example, the information associated with the second user may be transmitted from the second user device to the first user device using a wireless communication protocol.

At 606, the process 600 may involve generating a transaction record. In some embodiments, the transaction record may include at least a portion of the information related to the second user. In some embodiments, the transaction record may include at least an electronic signature generated using a private cryptographic key associated with the first user.

At 608, the process 600 may involve conveying the transaction record to a server. In some embodiments, the server may be a registry network node including a distributed database. In at least some of these embodiments the transaction record may be appended to a series of transaction records which represents an ownership registry. Such a series of transaction records may be a blockchain ledger. In some embodiments, the server may be a mobile application server which maintains accounts for a plurality of users. The second user device may be identified by virtue of being associated with an account maintained by a mobile application server in relation to the second user. In at least some of these embodiments, the mobile application server may record the transaction record within an ownership registry.

Prior to adding the transaction record to an ownership registry, the server may be caused to verify the transaction record. This may involve verifying that the first user device has authority to grant access rights for the electronic device as well as verifying the electronic signature. Verifying that the first user device has authority to grant access rights for the electronic device may involve determining that the operator of the first user device is a current owner of the electronic device. This may further involve identifying the latest transaction record in the ownership registry related to the electronic device and determining that it involves a transfer of ownership to the operator of the first user device. Verifying the electronic signature comprises applying a public cryptographic key associated with the first user to the electronic signature and comparing the result to the information associated with the second user included in the transaction record.

Upon verification of the transaction record, a device key associated with the electronic device may be caused to be provided to a second user device associated with the second user. The device key grants the access rights for the electronic device for the second user device.

At 610, the process 600 may optionally involve automatically removing the device key associated with the electronic device from a memory of the first user device. In some embodiments, this may be done upon receiving an indication that the transaction record has been successfully verified.

Figure 7:
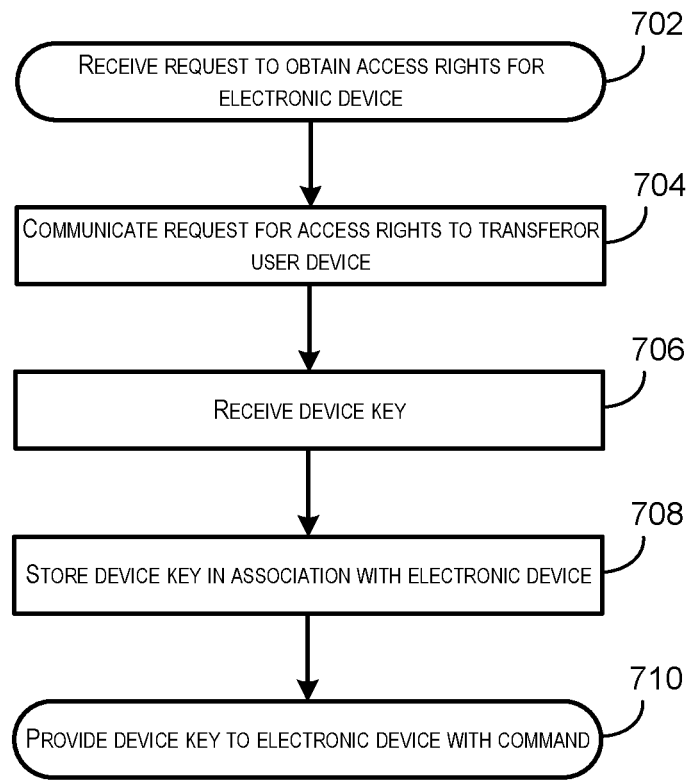
FIG. 7 depicts a flow diagram illustrating a process for obtaining access rights for an electronic device at a first user device from a second user device in accordance with at least some embodiments.

FIG. 7 depicts a flow diagram illustrating a process for obtaining access rights for an electronic device at a first user device from a second user device in accordance with at least some embodiments. The process 700 of FIG. 7 may be performed by at least the user device 104 described with respect to FIG. 2. More particularly, process 700 of FIG. 7 is depicted as being performed by a user device which seeks to obtain access rights for the electronic device.

Process 700 may begin at 702 when a request is received at a transferee user device to obtain access rights for an electronic device. In some embodiments, the request may be received from a user of the user device via a graphical user interface. For example, upon entering wireless communication range of an electronic device, the transferee user device may detect the electronic device. The user may be made capable of selecting an option to purchase or rent the electronic device via a graphical user interface executed on the transferee user device and a request to purchase or rent may be received by the transferee user device upon a user making such a selection.

At 704, the process 700 may involve communicating a request for access rights to a transferor user device. In some embodiments, the request is communicated directly between the transferee user device and the transferor user device. In some embodiments, the request is communicated first by the transferee user device to a mobile application server, and the mobile application server then forwards the request to the transferor user device upon identifying the transferor user device as being currently associated with the electronic device.

At 706, the process 700 may involve receiving a device key associated with the electronic device. In some embodiments, the device key may be included within an encrypted packet of data, the encrypted packet of data being accessible by the electronic device. In other words, the transferee user device may be prevented from accessing the device key stored in the encrypted packet. In some embodiments, the encrypted packet of data may include at least one dynamic data element. For example, the at least one dynamic data element may be a counter value which is increased or decreased with each grant of access rights. In this example, commands accompanied by an encrypted packet that include a counter value less than or greater than a current counter value stored in the electronic device may not be executed even if the encrypted packet includes a valid device key. In another example, the at least one dynamic data element may include a device identifier for the transferee user device. In this example, commands issued by a user device whose identifier does not match the device identifier for the transferee user device may not be executed even if the encrypted packet includes a valid device key.

At 708, the process 700 may involve storing the received device key in local memory. In some embodiments, the user device may have stored in local memory a number of different device keys, with each device key mapped to a corresponding electronic device (e.g., via an electronic device identifier).

At 710, the process 700 may involve, upon receiving instructions to issue a command to the electronic device, providing the command to the electronic device after confirming to the electronic device that the user device has the corresponding device key, or by providing the corresponding device key along with the command. As described elsewhere, the device key may be provided to the electronic device within an encrypted packet which can be decrypted by the electronic device using a cryptographic key stored in memory of the electronic device.

Embodiments of the disclosure provide for a number of technical advantages over conventional systems. In particular, embodiments of the described system enable access rights for an electronic device (enabled via a device key) to be transferred between accounts automatically and with minimal effort on behalf of either the transferor or the transferee. Additionally, each party to the transaction is able to remain relatively anonymous to the other party while ensuring that the transfer of access rights can be conducted in a secure manner. The system also ensures that access rights are granted quickly and without the risk that a user will fail to provide those access rights. Additionally, some embodiments also prevent a previous owner from keeping access rights to the electronic device after having sold the electronic device, which can also prevent the previous owner from effectively re-selling the previous sold electronic device to another party. The system provides a clear chain of title that can be used to verify both current ownership and that an electronic device has not been unlawfully obtained.

Furthermore, in some embodiments of the system described herein, a transfer of access rights to an electronic device between users can occur without those two users needing to meet up. For example, a user in the vicinity of the electronic device may detect the electronic device via a short-range communication protocol in his or her user device. Upon detecting the presence of such an electronic device, the user may decide to initiate a purchase or rental of the electronic device by submitting a request to a remote server. The remote server can then forward the request to the current owner of the electronic device and that user can grant or deny the request without ever needing to meet with the requestor.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:
receiving, at a transferee user device, a first request to obtain access rights for an electronic device associated with a transferor user device;
providing, to the transferor user device, a second request to grant access rights for the electronic device associated with the transferor user device;
receiving, at the transferee user device, a device key associated with the electronic device;
storing the device key in association with the electronic device in memory of the transferee user device;
issuing a command from at least one of the transferee user device or the transferor user device to unlock the electronic device; and
causing the electronic device to comply with the command to unlock if the at least one of the transferee user device or the transferor user device that issues the command has access to the device key when the command is issued.

2. The method of claim 1, wherein the device key is included within an encrypted packet of data, the encrypted packet of data being accessible by the electronic device.

3. The method of claim 2, wherein the encrypted packet of data includes at least one dynamic data element.

4. The method of claim 3, wherein the at least one dynamic data element comprises a counter value.

5. The method of claim 3, wherein the at least one dynamic data element comprises a device identifier for the transferee user device.

6. The method of claim 1, wherein the method further comprises:
providing, to the transferor user device, an identifier of an account associated with a user of the transferee user device.

7. The method of claim 1, wherein the method further comprises:
using an optical code reader communicatively coupled with the transferee user device to read a machine-readable code generated by the transferor user device.

8. A user device associated with a user comprising:
a processor; and
a memory including instructions that, when executed with the processor, cause the user device to, at least:
receive a first request to obtain access rights for an electronic device associated with a transferor user device;
provide, to the transferor user device, a second request to grant access rights for the electronic device associated with the transferor user device;
receive a device key associated with the electronic device;
store the device key in association with the electronic device in memory of the user device;
issue a command from at least one of the user device or the transferor user device to unlock the electronic device; and
cause the electronic device to comply with the command to unlock if the at least one of the user device or the transferor user device that issues the command has access to the device key when the command is issued.

9. The user device of claim 8, wherein the device key is included within an encrypted packet of data, the encrypted packet of data being accessible by the electronic device.

10. The user device of claim 9, wherein the encrypted packet of data includes at least one dynamic data element.

11. The user device of claim 10, wherein the at least one dynamic data element comprises a counter value.

12. The user device of claim 10, wherein the at least one dynamic data element comprises a device identifier for the user device.

13. The user device of claim 10, wherein the instructions further cause the user device to:
provide, to the transferor user device, an identifier of an account associated with the user of the user device.

14. The user device of claim 10, wherein the instructions further cause the user device to:
use an optical code reader communicatively coupled with the user device to read a machine-readable code generated by the transferor user device.

15. A non-transitory computer-readable medium storing specific computer-executable instructions that, when executed by a processor, cause a user device operated by a first user to at least:
receive a first request to obtain access rights for an electronic device associated with a transferor user device;
provide, to the transferor user device, a second request to grant access rights for the electronic device associated with the transferor user device;
receive a device key associated with the electronic device;
store the device key in association with the electronic device in memory of the user device;
issue a command from at least one of the user device or the transferor user device to unlock the electronic device; and
cause the electronic device to comply with the command to unlock if the at least one of the user device or the transferor user device that issues the command has access to the device key when the command is issued.

16. The computer-readable medium of claim 15, wherein the device key is included within an encrypted packet of data, the encrypted packet of data being accessible by the electronic device.

17. The computer-readable medium of claim 16, wherein the encrypted packet of data includes at least one dynamic data element.

18. The computer-readable medium of claim 17, wherein the at least one dynamic data element comprises a counter value.

19. The computer-readable medium of claim 17, wherein the at least one dynamic data element comprises a device identifier for the user device.

20. The computer-readable medium of claim 15, wherein the instructions further cause the user device to:
use an optical code reader communicatively coupled with the user device to read a machine-readable code generated by the transferor user device.

* * * * *